United States Patent [19]

Yoshida et al.

[11] Patent Number: 4,480,269

[45] Date of Patent: Oct. 30, 1984

[54] TELEVISION CAMERA

[75] Inventors: Nobuaki Yoshida, Tokyo; Yoshio Mori, Kawasaki; Kazushige Ooi, Sagamihara; Sumio Sakai, Yokohama, all of Japan

[73] Assignees: Nippon Kogaku K.K., Tokyo; Tokyo Shibaura Denki Kabushiki Kaisha, Danagawa, both of Japan

[21] Appl. No.: 462,215

[22] Filed: Jan. 31, 1983

[30] Foreign Application Priority Data

Feb. 5, 1982 [JP] Japan ................................ 57-16320

[51] Int. Cl.³ .............................................. H04N 3/06
[52] U.S. Cl. .................................... 358/209; 358/211; 358/213; 354/227.1; 354/446
[58] Field of Search ............... 358/209, 211, 212, 213, 358/227; 354/446, 453, 202, 227.1, 271.1, 295

[56] References Cited

U.S. PATENT DOCUMENTS

| | | | |
|---|---|---|---|
| 3,986,022 | 10/1976 | Hyatt ...................................... | 250/205 |
| 4,218,120 | 8/1980 | Kawamura et al. .............. | 354/227.1 |
| 4,363,034 | 12/1982 | Grancoin et al. .................... | 358/213 |
| 4,431,288 | 2/1984 | Iwata et al. .......................... | 354/446 |
| 4,437,111 | 3/1984 | Inai et al. .............................. | 358/44 |

FOREIGN PATENT DOCUMENTS 2248183  9/1972  Fed. Rep. of Germany ........ 358/81

*Primary Examiner*—Gene Z. Rubinson
*Assistant Examiner*—Robert Lev
*Attorney, Agent, or Firm*—Michael N. Meller

[57] ABSTRACT

A television camera equipped with an active filter section capable of producing dynamic special effects in the picture. The filter section of the camera includes an electro-optic light control device which is arranged in the optical path of the imaging optical section of the television camera such that its light transmittance for the incident light to the image screen of the camera is varied in response to the application of an electric signal, and the variable transmittance area is divided into a plurality of sections adapted to be controlled and driven selectively. Also, the camera includes a drive unit for selectively controlling and driving the sections of the electro-optic light control device so as to vary with time the spread of the area of the sections having the transmittance varied in response to the application of the electric signal.

6 Claims, 18 Drawing Figures

TELEVISION CAMERA

BACKGROUND OF THE INVENTION

The present invention relates to television cameras and more particularly to a television camera equipped with an active filter section employing an electro-optic light control device to produce dynamic special effects in a picture.

The devices heretofore known as so-called filters for television cameras include, for example, an infrared cut-off filter and a color temperature conversion filter and all of these filters are of the type having a static function and hence incapable of producing dynamic special effects in a picture.

SUMMARY OF THE INVENTION

It is a primary object of this invention to provide a television camera equipped with a filter section employing an electro-optic light control device to provide dynamic special effects.

It is another object of this invention to provide a television camera equipped with a filter section capable of providing a dynamic special effect which selectively produces an area having a different brightness in a picture and varies the spread of the area with the passage of time.

In accordance with this invention there is thus provided a television camera including a filter having an electro-optic light control device, a drive unit for driving the electro-optic light control device, an imaging optical system and an image pickup section, and the electro-optic light control device is arranged in the optical path of the imaging optical system of the television camera so that the light transmittance for the incident light to the image screen of the camera is varied by the application of an electric signal. Particularly, in accordance with the invention the variable transmittance area of the electro-optic light control device is divided into a plurality of sections and moreover the sectional areas can be selectively controlled and driven by the electric signal. The drive unit controls and drives the electro-optic light control device so that an electric signal is selectively applied to the sectional areas of the filter and the spread of the sections having the varied transmittance is varied with the lapse of time within the picture.

In accordance with this invention the electro-optic light control device may specifically be comprised of an electrochromic device or liquid crystal device and an all solid-state electrochromic device of the type disclosed in U.S. Pat. No. 4,350,414 or the corresponding German Laid-Open Patent Publication No. 3,023,846 may be used advantageously with the invention.

In accordance with the television camera of the invention, while the incident light through the imaging optical system is directly projected onto the image screen of the image pickup section, e.g., the image pickup tube or solid-state image pickup device if the electro-optic light control device of the filter is not driven, if the electro-optic light control device is driven in response to a desired pattern signal, a dynamic special effect is produced which for example spreads a dark portion from the top to the bottom or from the left to the right of the picture and this is particularly effective during a shift from one picture to another.

Preferred embodiments of this invention will be described in greater detail with reference to the accompanying drawings.

DESCRIPTION OF THE PREFERRED EMBODIMENTS

Figure 1:
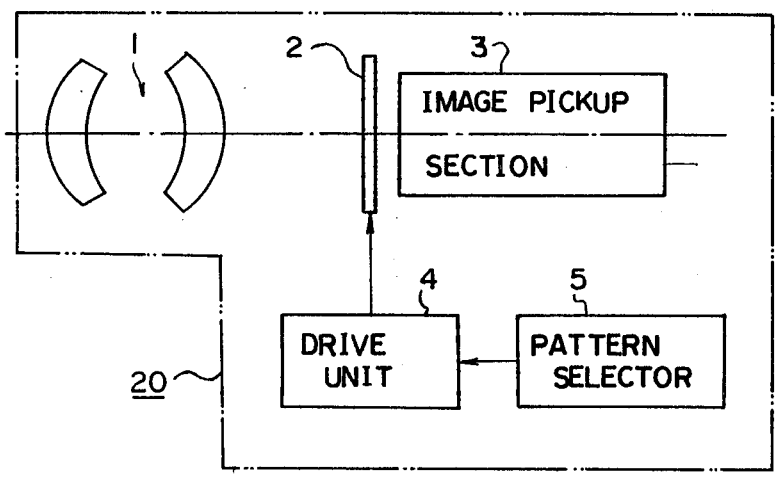
FIG. 1 is a block diagram of an embodiment of a television camera according to the invention showing its image pickup section and a filter section.

Referring to FIG. 1, a television camera generally designated by a reference numeral 20 includes an imaging optical section 1 for producing an image of a televised object, a filter 2 positioned in the back of the optical section 1 and having an electro-optic light control device, an image pickup section 3 arranged on the image forming plane of the optical section 1 to convert the image of the televised object on the image forming plane to an electric signal, a pattern selector 5 for selecting an operating pattern of the filter 2, and a drive unit 4 responsive to the output of the pattern selector 5 to control and drive the electro-optic light control device of the filter 2 in various modes of operation. Here, the image pickup section 3 comprises for example a solid-state image pickup device such as CCD (charge coupling device) or an image pickup tube. In this embodiment, the filter 2 is positioned in the optical path to the image screen of the image pickup section 3 from the imaging optical section 1, particularly just before the image screen. When the electro-optic light control device is not driven, the filter 2 is transparent over its entire area which passes the image light incident to the image screen, and when the electro-optic light control device is driven, the filter 2 becomes opaque in a part of the said area and the extent of the opaque area is varied moment by moment as will be described later.

Figure 2:
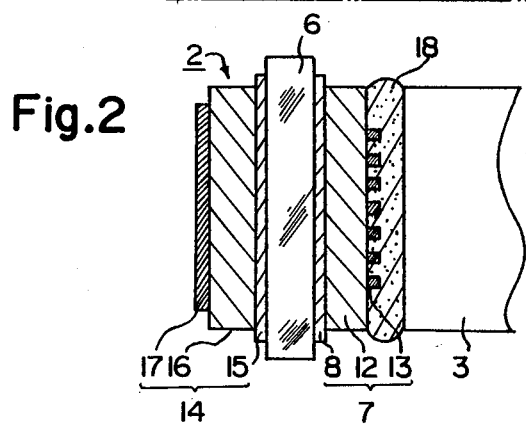
FIG. 2 is a schematic longitudinal sectional view showing a specific example of the construction of the filter section.
Figure 3:
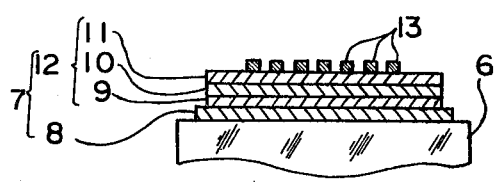
FIG. 3 is a schematic sectional view showing a detailed exemplary construction of the electrochromic element in the filter.

FIG. 2 is a schematic longitudinal sectional view showing a specific example of the construction of the filter 2, and the filter 2 includes electro-optic light control elements or a first electrchromic element or device 7 and second electrochromic element or device 14 (hereinafter referred to as a first EC element 7 and second EC element 14) which are formed on the sides of a transparent base 6 made of glass or plastic material. The filter 2 is fixed with a transparent adhesive 18 on the image screen of the image pickup section 3. The first EC element 7 includes a common transparent electrode layer 8, an electrochromic coloration layer 12 and a pattern transparent electrode layer 13 which are superposed in this order from the side of the transparent base 6, and the second EC element 14 includes a common transparent electrode layer 15, an electrochromic coloration layer 16 and a pattern transparent electrode layer 17 which are superposed in this order from the side of the transparent base 6. The first and second EC elements 7 and 14 are substantially of the same construction and an example of a specific construction of the first EC element 7 is shown in FIG. 3. More specifically, in FIG. 3 the common transparent electrode layer 8 is formed uniformly over substantially the whole surface of the transparent base 6, and the coloration layer 12 includes a first electrochromic layer 9 composed for example of iridium hydroxide and having oxidation coloration properties, a good ion-conductive layer 10 composed for example of tantalum oxide and a second electrochromic layer 11 composed for example of tungsten oxide having reduction coloration properties. The first electrochromic layer 9, the good ion-conductive layer 10 and the second electrochromic layer 11 are uniformly superposed on the common transparent electrode 8 in this order. Placed on the second electrochromic layer 11 is the pattern transparent electrode layer 13 comprising a plurality of transparent bar electrodes arranged at predetermined spaces. The portions of the coloration layer 12 facing the bar electrodes of the transparent pattern electrode layer 13 are adapted for coloration. As described in detail in the above-mentioned U.S. Pat. No. 4,350,414, this type of EC element is produced by means of a known film-forming process such as vacuum evaporation and each of the layers 8, 9, 10, 11 and 13 is in the form of a very thin film.

Figure 4:
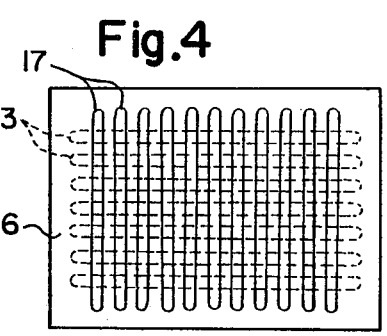
FIG. 4 is a schematic diagram showing the arrangement of the pattern transparent electrodes in the filter as views from the front thereof.

The second EC element 14 has the similar laminated construction as the above-described first EC element 7 and the bar electrodes of its pattern transparent electrode layer 17 is arranged side by side in a direction perpendicular to those of the transparent pattern electrode layer 13 of the first EC element 7 as shown in FIG. 4. While each of the first and second EC elements 7 and 14 is transparent in the non-driven condition, when an electric signal of a coloration inducing polarity is applied between the common transparent electrode layer 8 or 15 and the pattern transparent electrode layer 13 or 17 thus driving the EC element 7 or 14, it colors and its light transmittance is decreased. As a result, by selectively applying the electric signal to the bar electrodes of the pattern transparent electrode layer 13 or 17, it is possible to selectively vary the transmittance of those portions of the coloration layer 12 facing the selected bar electrodes.

Figure 5A:
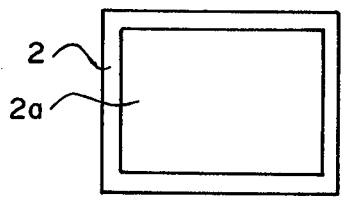
FIGS. 5a to 5e show an example of a filter operation pattern varying with time.
Figure 5B:
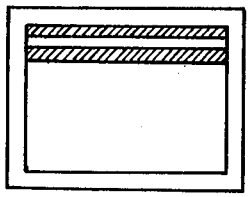
Figure 5C:
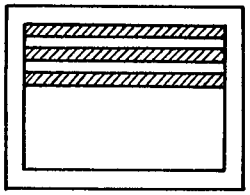
Figure 5D:
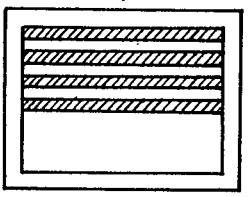
Figure 5E:
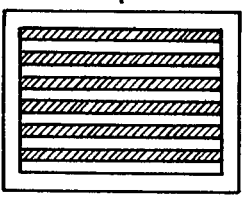
Figure 6A:
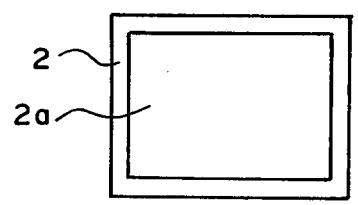
FIGS. 6a to 6e show another example of the filter operation pattern varying with time.
Figure 6B:
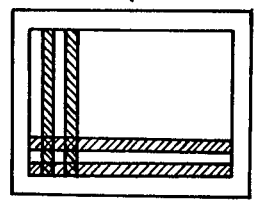
Figure 6C:
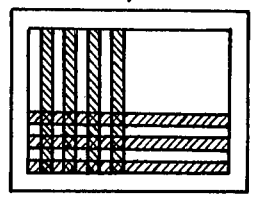
Figure 6D:
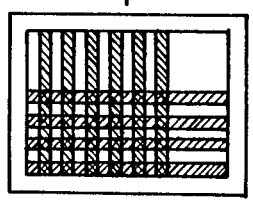
Figure 6E:
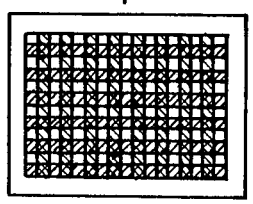

In other words, if, for example, a "vertical wiping coloration pattern" is selected by the pattern selector 5, in response to the output of the pattern selector 5 the drive unit 4 drives the first EC element 7 by applying an electric signal to the bar electrodes of the pattern transparent electrode layer 13 from the top to the bottom successively in a timed sequence and thus a colored area which spreads successively from the hatched upper bar electrodes to the lower bar electrodes in the order of FIG. 5b, FIG. 5c, FIG. 5d and FIG. 5e is produced on an image light transmission area 2a of the filter 2 which is transparent as shown in FIG. 5a, thereby providing a dynamic special effect which gradually darkens the picture from the top toward the bottom. In this case, the transmittance of the colored area can be varied suitably by adjusting the electric signal applied from the drive unit 4 and thus the degree of darkness of the picture can be controlled arbitrarily.

On the other hand, if a "horizontal wiping coloration pattern" is selected by the pattern selector 5, in the like manner as mentioned above the second EC element 14 spreads the colored area gradually from the left side to the right side with time. Further, if the vertical and horizontal wiping coloration patterns are selected together, a dynamic special effect is produced such that the colored area indicated by the hatching geadually spread over the transparent area from two directions perpendicular to each other as shown in FIGS. 6a to 6e.

Figure 7:
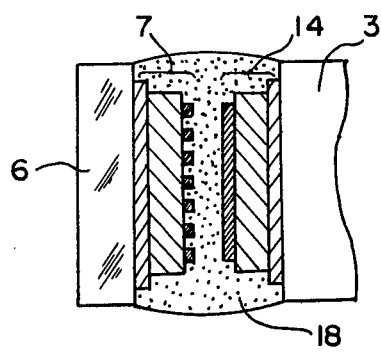
FIG. 7 is a schematic sectional view showing a modification of the filter construction.

While, in the above-described embodiment, the first and second EC elements 7 and 14 are arranged back to back on the sides of the single transparent base 6, this construction may of course be modified as shown in FIG. 7, for example. More specifically, only the first EC element 7 is formed on one side of the transparent base 6 and the second EC element 14 is directly formed on the image screen of the image pickup section 3 by the film forming process. The two EC elements 7 and 14 are fastened together with the transparent adhesive 18 to face each other. The construction of FIG. 7 has the effect of arranging the EC elements 7 and 14 closer to each other in distance and closer to the image screen and making clear the edges of the borders of a colored area appearing in the picture.

Figure 8:
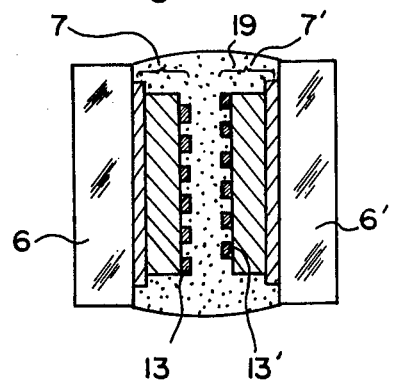
FIG. 8 is a schematic sectional view showing another example of the filter construction.

FIG. 8 shows the construction of a filter used in another embodiment of the invention and the filter comprises a first EC element 7 formed on a transparent base 6 and a second EC element 7' formed on another transparent base 6' and having its pattern transparent electrode layer 13' of which bar electrodes are arranged in the same direction and with the same pitch as those of the pattern electrode layer 13 of the first EC element 7. The two EC elements are fastened together with a transparent adhesive 19 such that their pattern electrode layers 13 and 13' face each other and that the pattern electrodes of one of the two pattern electrode layers are opposed to the gaps between the adjacent bar electrodes of the other, that is, the two pattern electrode layers are displaced in phase by a half pitch with each other. The transparent base 6' is positioned just before the image pickup section. In this case, by selecting the width of each bar electrode of the pattern transparent electrode layer 13 or 13' greater in dimension than the gap width of the other pattern transparent electrode, it is possible to alternately successively drive the two EC elements 7 and 7' and thereby cause the whole area of the filter 2 to color closely. Of course, it is possible to utilized the image screen itself of the image pickup section in place of the transparent base 6' and thereby form the second EC element 7' directly on the image screen.

Figure 9:
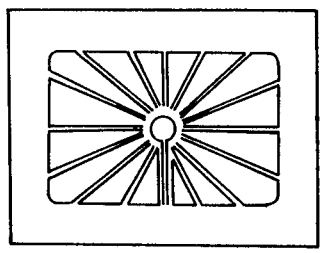
FIGS. 9 and 10 are schematic diagrams showing filter patterns according to another embodiments.
Figure 10:
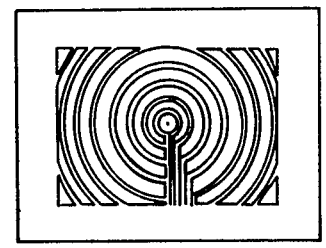

Further, in accordance with the invention the coloration area of the filter is not intended to be limited to the horizontal and vertical bar forms shown in the previously mentioned exaples and it is possible to conceive any of various other patterns, e.g., a sectional coloration area radially dividing the picture into sectors as shown in FIG. 9 and a circular coloration area concentrically dividing the picture as shown in FIG. 10.

Further, while, in the above-described embodiments, the filter 2 is arranged very close to the image screen of the image pickup section 3, the invention does not preclude the arrangement of the filter 2 at a distance from the image screen and the filter 2 may for example be positioned in the front or back of the iris diaphragm in the imaging optical section so as to blur the edges of the colored area in accordance with the distance of the filter 2 from the image screen. It is to be noted that if the filter 2 is arranged at the position of the iris diaphragm, the resulting variation in the spread of the colored area in the filter 2 causes only a uniform change in the illuminance over the whole surface of the image screen.

From the foregoing description it will be seen that the present invention provides a television camera with a filter section capable of producing a dynamic special effect which selectively produces an area of a different brightness in the picture and varies the spread of this area with time. The filter section can be made very small in size and light in weight by means of the known thin film forming techniques or the like and thus it can be incorporated in a home television camera as an integral part.

What is claimed is:

1. In a television camera including an imaging optical system, and an image pickup device arranged on an image forming plane of said imaging optical system for converting an image of a televised object from said imaging optical system to an electric signal, the improvement comprising:
    (a) electro-optic light control means (2) arranged in an optical path of said imaging optical system, said electro-optic light control means being divided into a plurality of sections (13, 17) each thereof being responsive to the application of an electric signal to vary the light transmittance thereof; and
    (b) drive means (4) electrically connected to said electro-optic light control means (2) to apply an electric signal to each of said plurality of sections in a predetermined sequence and thereby vary the light transmittance of said electro-optic light control means selectively and with time.

2. A television camera according to claim 1, wherein said electro-optic light control means (2) is arranged just in front of an image screen of said image pickup device.

3. A television camera according to claim 2, wherein said electro-optic light control means (2) comprises an all solid-state electrochromic device.

4. A television camera according to claim 3, wherein said electrochromic device (7, 14) is directly formed on said image pickup device by a film forming process.

5. A television camera according to claim 2, wherein said electro-optic light control means (2) comprises a plurality of electro-optic light control elements (7, 14) arranged successively in said light path, and wherein each of said elements is divided into a plurality of sections (13, 17) each thereof being responsive to the application of an electric signal to vary the light transmittance thereof.

6. A television camera according to claim 5, wherein the number of said elements (7, 14) is two, and wherein said two elements are arranged such that each of the sections of one of said two elements faces the gap between the adjacent sections of the other of said two elements.

* * * * *